(12) United States Patent
Nagano et al.

(10) Patent No.: US 7,671,818 B2
(45) Date of Patent: Mar. 2, 2010

(54) ANTENNA DEVICE WITH INTEGRATED CONNECTION CABLE, AND RADIO APPARATUS

(75) Inventors: Kenya Nagano, Ishikawa (JP); Shingo Sumi, Kanagawa (JP); Yutaka Saito, Ishikawa (JP); Hiroyuki Sasaki, Kanagawa (JP); Yoshio Koyanagi, Kanagawa (JP); Kazuya Tani, Kanagawa (JP)

(73) Assignee: Panasonic Corporation, Kadoma-shi (JP)

( * ) Notice: Subject to any disclaimer, the term of this patent is extended or adjusted under 35 U.S.C. 154(b) by 425 days.

(21) Appl. No.: 11/815,289

(22) PCT Filed: Nov. 22, 2005

(86) PCT No.: PCT/JP2005/021459

§ 371 (c)(1),
(2), (4) Date: Aug. 1, 2007

(87) PCT Pub. No.: WO2006/082683

PCT Pub. Date: Aug. 10, 2006

(65) Prior Publication Data

US 2009/0015505 A1     Jan. 15, 2009

(30) Foreign Application Priority Data

Feb. 2, 2005   (JP)   ............................. 2005-026725
Aug. 26, 2005  (JP)   ............................. 2005-246451

(51) Int. Cl.
*H01Q 1/50*     (2006.01)
*H04R 25/00*    (2006.01)

(52) U.S. Cl. ....................... 343/850; 343/906; 381/384; 455/557

(58) Field of Classification Search ................. 343/850, 343/702, 906; 381/384; 455/557
See application file for complete search history.

(56) References Cited

U.S. PATENT DOCUMENTS 7,292,705 B2 * 11/2007 Harano ....................... 381/384

(Continued)

FOREIGN PATENT DOCUMENTS

JP            1-122610        8/1989

(Continued)

*Primary Examiner*—Tan Ho
(74) *Attorney, Agent, or Firm*—Christensen O'Connor Johnson Kindness PLLC

(57) ABSTRACT

The objective of the present invention is to provide a connection cable that serves as an external antenna for a radio apparatus, and whose antenna performance is not deteriorated in the use state by an adverse affect attributable to the near proximity of a human body.

According to the present invention, an antenna device, integrally formed with first connection means, which is to be connected to a radio apparatus, second connection means, which is to be connected to a peripheral device, and a connection cable and an antenna element, which are located in between and which transmit a plurality of signals from the radio apparatus to the peripheral device, includes: first relay means, located at a middle position in the connection cable, for relaying the plurality of signals; the antenna element, located between the second connection means and the first relay means; and a coaxial line, located between the first connection means and the first relay means for transmitting, to the radio apparatus, an antenna reception signal that has been received at the antenna element and has been extracted by the first relay means, wherein the antenna element serves as an external antenna for the radio apparatus.

30 Claims, 12 Drawing Sheets

U.S. PATENT DOCUMENTS

2008/0254831 A1* 10/2008 Mukai et al. ................. 455/557
2009/0052720 A1* 2/2009 Nishi et al. ................. 381/384

FOREIGN PATENT DOCUMENTS

| | | |
|---|---|---|
| JP | 2000-349868 | 12/2000 |
| JP | 2002-314450 | 10/2002 |
| JP | 2005-333459 | 12/2005 |
| JP | 2005-333613 | 12/2005 |
| JP | 2005-348252 | 12/2005 |

* cited by examiner

US 7,671,818 B2

ANTENNA DEVICE WITH INTEGRATED CONNECTION CABLE, AND RADIO APPARATUS

TECHNICAL FIELD

The present invention relates to an antenna device constituted by a connection cable for connecting a portable radio apparatus and a peripheral device.

BACKGROUND ART

As radio apparatuses, such as cellular phones, have spread, multiple peripheral devices, such as earphones and microphones, to be connected to the radio apparatuses have been developed.

Generally, the peripheral devices and the radio apparatuses are connected by connection cables.

A communication function is a basic function for a radio apparatus, and the performance of this function is important.

Therefore, for example, in patent document 1 is proposed an earphone wire whereby, as shown in FIG. 11, a signal line 31 in a connection cable is used as an antenna to complement the communication performance of a radio apparatus. Furthermore, in patent document 2 is disclosed an earphone cable whereby, as shown in FIG. 12, an antenna device 32 is arranged at the portion of a connection cable near the main body of a radio apparatus (see patent documents 1 and 2).

Patent Document 1: JP-A-2002-314450
Patent Document 2: JP-A-2000-349868

DISCLOSURE OF THE INVENTION

Problems that the Invention is to Solve

However, according to the invention described in patent document 1, since the entire earphone cable is employed as an antenna, an adverse affect, attributable to the proximity of a nearby person, tends to be conveyed when, for example, the person grasps the cable, and accordingly, the function of the antenna is deteriorated. According to the invention described in patent document 2, an adverse affect attributable to the proximity of a nearby person tends to be conveyed, and accordingly, the antenna function is deteriorated.

Means for Solving the Problems

According to the present invention, an antenna device, integrally formed with first connection means, which is to be connected to a radio apparatus, second connection means, which is to be connected to a peripheral device, and a connection cable and an antenna element, which are located in between and which transmit a plurality of signals from the radio apparatus to the peripheral device, comprises:

first relay means, located at a middle position in the connection cable, for relaying the plurality of signals;

the antenna element, located between the second connection means and the first relay means; and a coaxial line, located between the first connection means and the first relay means for transmitting, to the radio apparatus, an antenna reception signal that has been received at the antenna element and has been extracted by the first relay means, wherein the antenna element serves as an external antenna for the radio apparatus.

With this arrangement, when the connection cable that serves as the external antenna of the radio apparatus is employed, part of the connection cable is maintained separate from a user, at a constant distance. Therefore, deterioration of the antenna performance due to the adverse affect attributable to a human body can be reduced.

Further, according to the antenna device of the present invention, the first relay means includes a first inductance element, which is to be inserted in series into at least one of a plurality of signal lines extended to the peripheral device; the second connection means includes a second inductance element, which is to be inserted in series into the plurality of signal lines; the first inductance element and the second inductance element, which at least pass an audio signal while blocking the antenna reception signal; and the first relay means extracts the antenna reception signal.

With this arrangement, when high-frequency capacitive coupling is performed for signal lines located parallel to the antenna element, the leaking of a high frequency signal from the antenna element to the signal lines can be prevented.

Furthermore, according to the antenna device for the present invention, an external conductive member for a coaxial cable, which employs the coaxial line as a core line, is connected to a ground potential of the radio apparatus; the first relay means includes a capacitance element on the first connection means side, relative to the first inductance element; and the capacitance element is arranged between the plurality of signal lines and the external conductive member.

With this arrangement, the external conductive member for the coaxial cable and portions of the signal lines that are parallel to the coaxial cable have the same potential, with a high frequency. The leaking of a high-frequency current is prevented to the portion of the signal line that is parallel to the coaxial cable, and deterioration of the antenna performance can be prevented.

In addition, for the antenna device of the present invention, the first relay means includes a capacitance element on the second connection means side, relative to the first inductance element; the capacitance element is arranged between the plurality of signal lines and the coaxial line; and instead of the antenna element, at least one of the signal lines is operated as a monopole antenna and serves as an external antenna for the radio apparatus.

With this arrangement, the signal line can be employed as an antenna element, and since an antenna is not prepared separately, a high performance antenna can be obtained that has a simple structure.

Moreover, for the antenna device of the present invention, the second connection means includes control means, for controlling the radio apparatus via the connection cable and the coaxial cable.

With this arrangement, in the use state, a user can control the radio apparatus by using the control means provided along the connection cable, so that usability for the user is improved.

Furthermore, according to the present invention, an antenna device, integrally formed with first connection means, which is to be connected to a radio apparatus, a connection cable, along which a plurality of signals are transmitted from the radio apparatus to a peripheral device, and an antenna element, comprises:

first relay means and second relay means, for relaying the plurality of signals, positioned at a predetermined interval at locations along the connection cable;

the antenna element, located between the first relay means and the second relay means; and a coaxial means, located between the first connection means and the first relay means, for transmitting to the radio apparatus an antenna reception signal that is received by the antenna element and is extracted by the first relay means, wherein the antenna element serves as an external antenna for the radio apparatus.

Further, according to the present invention, an antenna device, integrally formed with first connection means, which is to be connected to a radio apparatus, connection cables, along which a plurality of signals are to be transmitted from the radio apparatus to a peripheral device, and a plurality of antenna elements, comprises:

first relay means, located at a position along one of the connection cables, for relaying the plurality of signals;

second relay means, branched from the first relay means and located at a position along one of the connection cables, for relaying the plurality of signals;

third relay means, branched from the first relay means and located at a position along the other connection cable, for relaying the plurality of signals;

a first antenna element, located between the first relay means and the second relay means;

a second antenna element, located between the first relay means and the third relay means; and a coaxial line, located between the first connection means and the first relay means, for transmitting to the radio apparatus an antenna reception signal that is received by the first antenna element and/or the second antenna element and is extracted by the first relay means, wherein the first antenna element and/or the second antenna element serves as an external antenna for the radio apparatus.

In addition, according to the present invention, an antenna device, integrally formed with first connection means, which is to be connected to a radio apparatus, a connection cable, along which a plurality of signals are to be transmitted from a radio apparatus to a peripheral device, and an antenna element, comprises:

first relay means and second relay means, located at a predetermined interval at locations positions the connection cable, for relaying the plurality of signals;

a first antenna element and a second antenna element, located along two cables that connect the first relay means and the second relay means; and a coaxial line, located between the first connection means and the first relay means, for transmitting to the radio apparatus an antenna reception signal that is received by the first antenna element and/or the second antenna element and is extracted by the first relay means, wherein the first antenna element and/or the second antenna element serves as an external antenna for the radio apparatus.

According to this arrangement, since the first antenna element and the second antenna element serve as antennas, the individual antenna elements resonate with each other, and high antenna performances can be obtained within a wide frequency range.

In addition, for the antenna device of the present invention, the first relay means includes a first inductance element, which is to be inserted in series in at least one of a plurality of signal lines to be extended to the peripheral device; the second relay means includes a second inductance element, which is to be inserted in series into at least one of the plurality of signal lines; the first inductance element and the second inductance element, which at least passes an audio signal while blocking the antenna reception signal; and the first relay means, which extracts the antenna reception signal.

Moreover, the antenna device for the present invention is characterized in that an external conductive member for a coaxial cable, which employs the coaxial line as a core line, is connected to a ground potential of the radio apparatus; the first relay means includes a capacitance element on the first connection means side, relative to the first inductance element; and the capacitance element is arranged between the plurality of signal lines and the external conductive member.

Also, for the antenna device of the present invention, the first relay means includes a capacitance element on the second relay means side, relative to the first inductance element; the capacitance element is arranged between the plurality of signal lines and the coaxial line; and instead of the antenna element, at least one of the signal lines is operated as a monopole antenna and serves as an external antenna for the radio apparatus.

Further, the antenna device of the present invention is characterized in that the second relay means includes control means, for controlling the radio apparatus via the connection cable and the coaxial cable.

Furthermore, the antenna device of the present invention is characterized in that electrical lengths differ between the first antenna element and the second element.

With this arrangement, since the first antenna element and the second antenna element that have different electrical lengths are operated as antennas at the same time, the antenna elements can resonate with each other, and a high performance antenna can be obtained that has a wide frequency range. Further, since the first antenna element and the second antenna element are separated by a constant distance, the communication functions do not affect each other. Also, in the use state, since the connection cable that serves as the external antenna of the radio apparatus is kept separate from a user, at a constant distance, the deterioration of the antenna performance due to an affect attributable to a human body can be reduced.

In addition, for the antenna device of the present invention, the peripheral device is earphones.

Moreover, the antenna device of the present invention is characterized in that, in the use state, during which the connection cable is connected to the radio apparatus, both or one of the first antenna element and the second antenna element is substantially horizontal.

According to this arrangement, since the antenna element, as maintained, is horizontal, the communication performance is improved relative to an electric wave for which the principal polarized wave is horizontal. Also, in the use state, one portion of the connection cable that is operated as the external antenna of the radio apparatus is kept separate from the user, at a constant distance. Therefore, the deterioration of the antenna performance due to an affect attributable to a human body can be reduced.

ADVANTAGES OF THE INVENTION

According to the present invention, in the use state, one portion of the connection cable that is operated as the external antenna of the radio apparatus is kept separate from a user, at a constant distance. Therefore, the deterioration of the antenna performance due to the affect attributable to a human body can be reduced.

DESCRIPTION OF REFERENCE NUMERALS AND SIGNS

Figure 1:
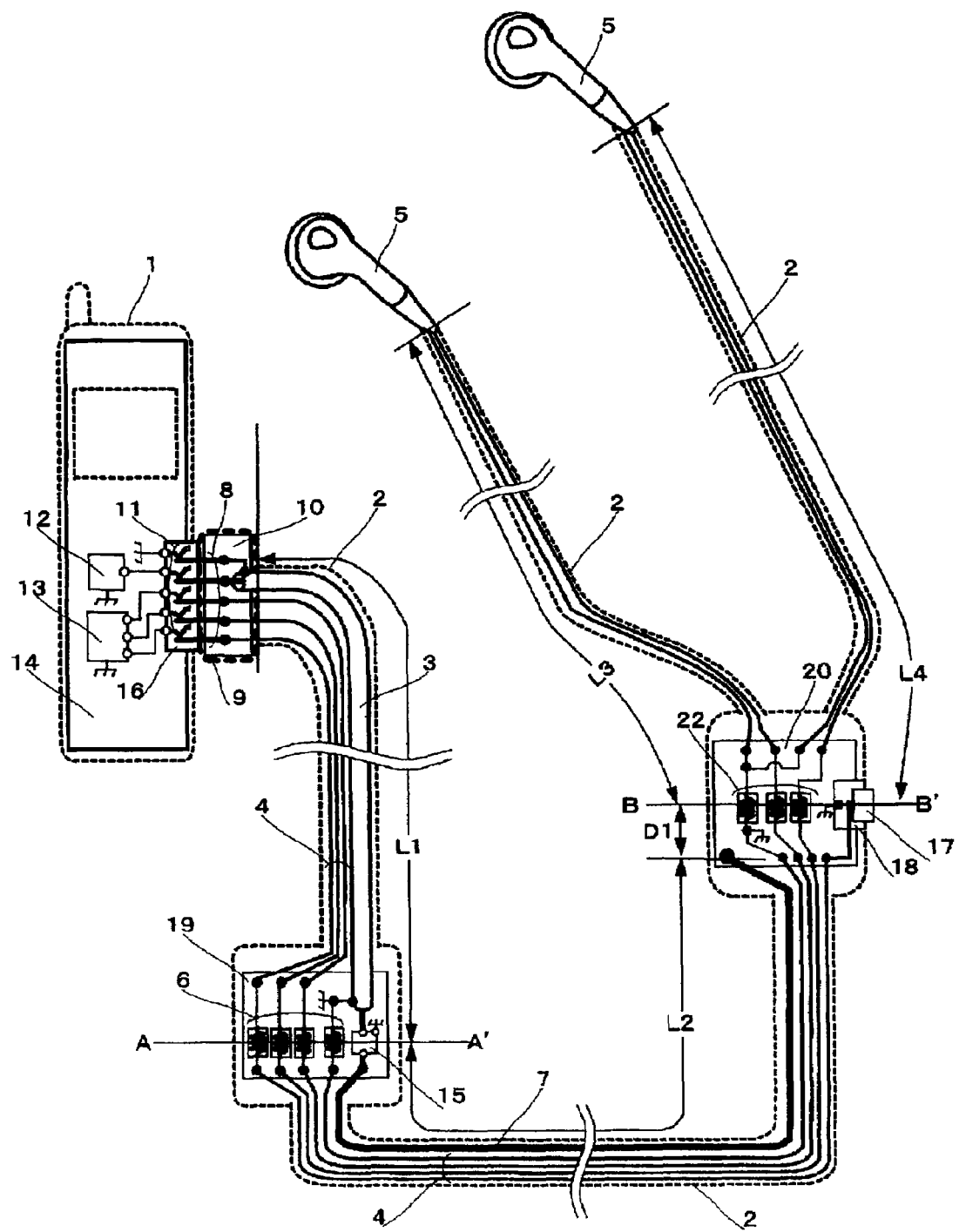
FIG. 1 is a schematic diagram showing a configuration for an antenna device and a portable radio apparatus according to a first mode according to the present invention.

1: portable radio apparatus
2: connection cable
3: coaxial cable
3a: coaxial line
4: signal line
5: earphone
6: inductance element
7: antenna element
8: connection pin
8a: peripheral device connector
9: first connection means
9a: second connection means
10: circuit board
11: terminal spring
12: radio circuit unit
13: control unit
14: circuit board
15: matching circuit
16: connector
17: push button
18: push type switch
19: first relay means
20: second relay means

BEST MODES FOR CARRYING OUT THE INVENTION

An antenna device and a radio apparatus (a portable telephone terminal, a PHS, a PDA, etc.) according to the modes of the present invention will now be described in detail while referring to drawings. In the explanation for the modes, assume that the antenna of the radio apparatus is employed to receive television broadcasts (a frequency of about 470 [MHz] to 700 [MHz]) whose principal polarized wave is horizontal. When means for changing the length of an antenna element is employed, for example, for FM broadcasts, in addition to the above described frequency band for the television broadcast, the present invention is effective, and the same effects are obtained.

(First Mode)

Figure 2:
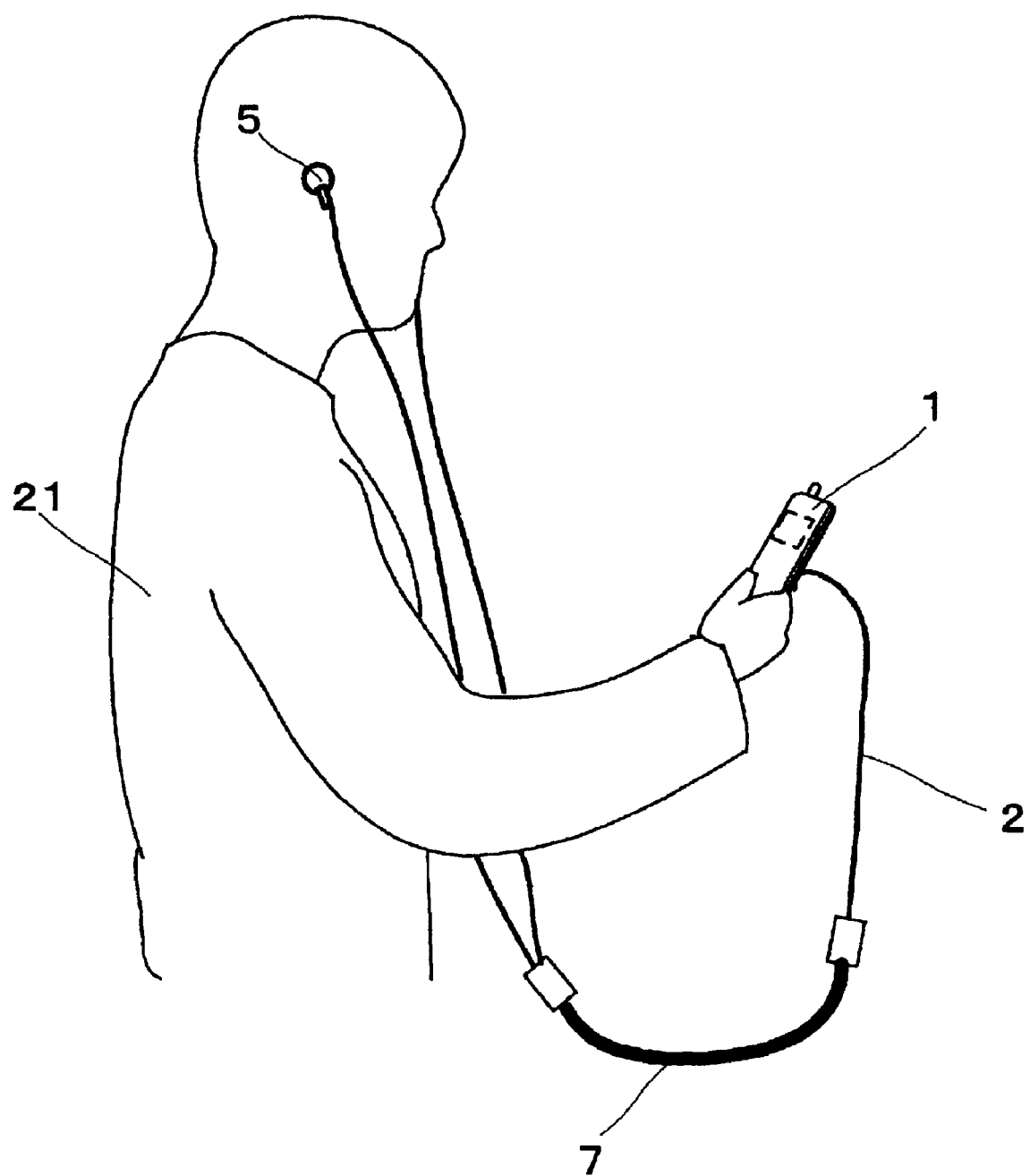
FIG. 2 is a diagram showing an example use (use state) of the first mode.

FIG. 1 is a schematic diagram showing a configuration for an antenna device and a radio apparatus according to a first mode of the present invention. FIG. 2 is a diagram showing an example use for the first mode.

In FIG. 1, a portable radio apparatus 1 includes: a connector 16, connected to first connection means 9 of a connection cable 2, and a circuit board 14. On the circuit board 14, a radio circuit unit 12 that includes a television tuner, a control unit 13 that includes an operation function and a storage function and a connector 16 are securely mounted using soldering, for example. A plurality of terminal springs 11 are provided inside the connector 16. The terminal springs 11 are connected, via a print pattern on the circuit board 14, to the radio circuit unit 12, the control unit 13 and a ground pattern that is a ground potential of the circuit board 14.

The connection cable 2 of the antenna device connects the first connection means 9 to an earphone unit 5, which is an example peripheral device. First relay means 19 and second relay means 20 are located at positions along the connection cable 2, and an antenna element 7 is arranged between the means 19 and 20. A coaxial cable 3 is laid between the first connection means 9 and the first relay means 19, so that a plurality of signal lines 4, including one for an audio signal, are extended from the radio apparatus 1 to the earphones, and a signal received by the antenna element 7 is extracted by the first relay means and transmitted to the portable radio apparatus along a coaxial line 3a that is an internal conductive member of the coaxial cable 3.

The first relay means 9 is located at one end of the connection cable and is fitted to the connector 16 of the housing 1. A circuit board 10 is arranged inside the first relay means 9. On the circuit board 10, a plurality of connection pins 8 are fixed using soldering, etc.

When the first relay means 9 of the connection cable 9 is connected to the connector 16 of the housing 1, the plurality of connection pins 8 are connected to the plurality of terminal springs 11 mechanically, and also electrically.

On In the circuit board 10, the coaxial line 3a of the coaxial cable 3, an external conductive member and the plurality of signal lines 4 are respectively fixed using soldering, etc., and are connected to the connection pins 8.

The coaxial cable 3 is a high-frequency transmission path of 75Ω, for example, and is formed of a flexible material. When the connector 16 is connected to the first connection means 9, the internal conductive member is connected to a radio connection unit 12, and the external conductive member is connected to the ground pattern on the circuit board 14. The outside of the external conductive member having the conductive property is covered with a non-conductive material. In the first mode, a length L1 of the coaxial cable is defined as 30 [cm].

The plurality of signal lines 4 are flexible conductive line members with outside surfaces covered with a non-conductive material, and are connected to the control unit 13.

The coaxial cable 3 and the plurality of signal lines 4 are covered with and bundled using a non-conductive material that constitutes the connection cable 2. In the connection cable 2, the metallic conductive members of the coaxial cable 3 and the plurality of signal lines 4 do not contact each other because of the non-conductive material that covers their outer surfaces.

The end of the coaxial cable 3 opposite the end near the first connection means 9 is connected to the first relay means 19. In the first relay means 19, a matching circuit unit 15 and a plurality of inductance elements 6 (first inductance elements) are fixed using soldering, etc.

One end of the matching circuit unit 15 is connected to the coaxial line 3a of the coaxial cable 3, while the other end is connected to the antenna element 7 (first antenna element) to serve as means for a function for controlling the impedance matching of the antenna element 7 to obtain 75Ω.

The plurality of inductance elements 6 are inserted in series into at least one of the plurality of signal lines. Further, for at least one of the plurality of inductance elements 6, one end is connected to metal at the same potential as the ground pattern that becomes the ground potential of the circuit board 14, while the other end is connected for the signal lines 4, and, while referring to FIG. 1, is connected to the external conductive member of the coaxial cable 3 and the signal lines 4.

When high-frequency capacitive coupling is performed for the signal lines 4, located parallel to the antenna element 7, and the antenna element 7, the inductance elements 6 prevent the leaking of a high frequency signal to the signal lines 4. That is, when the impedance is high, the plurality of inductance elements 6 function to provide a high frequency signal of about 470 [MHz] to 700 [MHz], which is a reception frequency for the first mode, or when the impedance is low, the inductance elements 6 function as a 50 [MHz] or lower or a direct-current element. The inductance elements 6 may also be a low-pass filter or an LC parallel resonance circuit.

Furthermore, through experiments, it has been confirmed that in the frequency band of 470 [MHz] to 700 [MHz], 400 [M] or greater is satisfactory as the inductance value for the inductance elements 6. Further, when the inductance value is 400 [nH] or smaller, or when inductance elements 6 having the self resonating frequency of 470 [MHz] to 700 [MHz] are employed, the same effects can be obtained.

In addition, it is preferable for the performance of the antenna that the plurality of inductance elements 6 be arranged along the line A-A'. When the inductance elements 6 are not located along the line A-A', high-frequency capacitive coupling occurs between the signal line 4, located on the side of the coaxial cable 3 of the inductance element 6, and the signal line 4, positioned directly across on the antenna element 7 side, without the inductance elements 6 intervening, so that the high frequency current leaks to the signal line 4 on the coaxial cable 4 side, and the performance of the antenna is degraded. Further, it is preferable, for the performance of the antenna, that the ground pattern that becomes the ground potential for the first relay means 19 not be arranged near the antenna side 7, across line A-A'.

The antenna element 7 is formed of a flexible conductive line member, and one end is connected to the first relay means 19 while the other end is connected to the second relay means 20. The antenna element 7 is electrically released on the second relay means side 20, and a length L2 is about ½ a wavelength to ⅔ a wavelength. In the first mode, L2 is defined as 45 [m].

Between the first relay means 19 and the second relay means 20 of the connection cable 20, the antenna element 7 and the plurality of signal lines 4 are arranged parallel to each other, and are covered with and bundled by a non-conductive material that constitutes the connection cable 20. Since the antenna element 7 and the plurality of signal lines 4 contact each other via a non-conductive material that covers the signal lines 4, metallic conductive members for the antenna element 7 and the signal lines 4 do not contact.

One end of the antenna element 7, the inductance elements 22 (the second inductance elements) and a push type switch 18 (a control means) are fixed to the second relay means 20 using soldering, etc.

A push button 17 is mounted on the push type switch 18, and when a user presses the push button 17, an electric signal is transmitted via the plurality of signal lines 4 to the control unit 13. For example, communication start and end for the radio apparatus are enabled by pressing the push button by hand, so that usability for the user is improved.

Further, a push type switch 18 must function as an external switch for the radio apparatus for changing, for example, volume or channels, and a plurality of these push type switches may be provided.

The inductance elements 22 are the same as the inductance elements 6, and are inserted in series into at least one of the plurality of the signal lines 4. The inductance elements 22 serve to perform a role, when capacitive coupling is performed between the antenna element 7 and the signal lines 4, for preventing the leaking of a high frequency signal to the signal lines 4 between the earphone unit 5 and the second relay means 20.

It is preferable for the antenna performance that the inductance elements 22 be arranged, in the second relay means 20, linearly along line B-B'. It is also preferable for the antenna performance that a distance D1, between the open end of the antenna element 7 and the inductance elements 22, be short. Through experiments, it has been confirmed that when D1 is 3 [cm] or shorter, a high performance antenna can be obtained.

At the second relay means 20, the plurality of signal lines 4 are branched two ways, and the earphone units 5 are connected to the individual distal ends. Distances L3 and L4, between the second relay means 20 and the earphone units 5, are about 50 [cm]. In the first mode, the same lengths are employed as for L3 and L4; however, the lengths are not limited to these. The lengths of the individual portions need only be balanced so that, as shown in FIG. 2, in the use state the portion of the connection cable 2 that includes the antenna element 7 is maintained in an almost horizontal state.

In the first mode, the connection cable 2 is an earphone cable, one end of which serves as the first connection means 9 and at the other end of which are the earphone units 5, the total length (L1+L2+L3) is about 125 [cm].

As shown in FIG. 2, in the use state, wherein a user 21 is watching the screen of a radio apparatus while holding the radio apparatus in hand, the antenna element 7 is separated from the user 21 by a constant distance, and is in a state near the horizontal. It should be noted that not all the antenna elements 7 need be horizontal, and that when about 30% of the length of the antenna element 7 is horizontal, an electric wave, for which the principal polarized wave is horizontal, can be efficiently received.

When a clip is attached to the first relay means 19 and is inserted, for example, into the chest pocket of a user in the use state, the position of the antenna element 7 can always be stabilized, regardless of the length of the connection cable 2 and the state wherein the connection cable 2 is led. Thus, a higher antenna performance can be obtained. It should be noted that when means for temporarily fixing the first relay means 19 in the chest pocket, or other closing means for positioning the first relay means is provided instead of a clip, the same effects can be obtained.

As for the radio apparatus and the connection cable 2 (the earphone cable) of the antenna device according to the first mode, when the first connection means 9 of the connection cable 2 is fitted to the connector 16 of the radio apparatus, the antenna element 7 serves as a monopole antenna having a length of about 45 [cm]. The matching circuit unit 15 provides a function for matching the impedance of the monopole antenna and the input impedance (generally 75Ω) of the radio circuit 12. Therefore, the junction point of the matching circuit unit 15 and the antenna element 7 is employed as a power supply point for the antenna. Further, an electric signal is transmitted via the plurality of signal lines 4 to the push switch 18 and the earphone units 5.

The antenna element 7 is located between the first relay means 19 and the second relay means 20, and in the middle of the entire connection cable 2. Therefore, in the use state shown in FIG. 2, since a distance at which radio reception is not adversely affected by a human body is ensured between the user 21 and the antenna element 7, a high antenna performance can be obtained. Further, an electric wave, for which the principal polarized wave is horizontal, can be efficiently received.

In the first mode, 125 [cm] has been defined as the entire length of the connection cable 2. However, the length is not limited to this, and the same effects can be obtained for an arrangement wherein, in the use state, the antenna element 7 becomes horizontal by adjusting the length from the coaxial cable 3 and the second relay means 20 to the earphone units 5.

It should be noted that, in the first mode, the end pertinent to the open end of the antenna element 7 has been connected to the second relay means 20. However, the arrangement is not limited to this, and so long as the distance D1 between the open end of the antenna element 7 and the inductance elements is 3 [cm] or shorter, the same effects can be obtained even though the open end of the antenna 7 is not connected to the second relay means 20.

In this mode, the first relay means 19, the second relay means 20 and the inductance elements mounted on them serve as relay means. The relay means for this invention need only be one that performs a function for blocking a high frequency, at the power supply point and the open end of the antenna element, for a conductive line, such as a signal line for an audio signal, a power line or a ground line that is extended parallel to the antenna element.

A specific antenna performance can be obtained when the location for blocking a high frequency for a conductive line is extended parallel to the antenna element, i.e., the location of the relay means is at only one of the power supply point and the open end of the antenna element. However, a higher antenna performance is obtained when two relay means are located at both the power supply point and the open end of the antenna element.

Further, in the explanation for this mode, a cable for connecting the earphone and the portable radio apparatus has been employed. However, the cable type is not limited to this, and when the same relay means and the same antenna element may be provided for a cable that connects various peripheral devices, such as a loudspeaker and a remote controller, to a portable radio apparatus, the above described effects can also be obtained. Furthermore, when the same relay means and antenna element are provided for a strap used for a user to suspend a portable radio apparatus from the neck, the same effects can be obtained.

In addition, in the explanation for this mode, the apparatus to which the connection cable according to the present invention is connected has been a portable radio apparatus. However, the apparatus is not limited to this, and the same effects can be obtained when the apparatus is a portable apparatus that receives television broadcasts or radio broadcasts.

(Second Mode)

Figure 3:
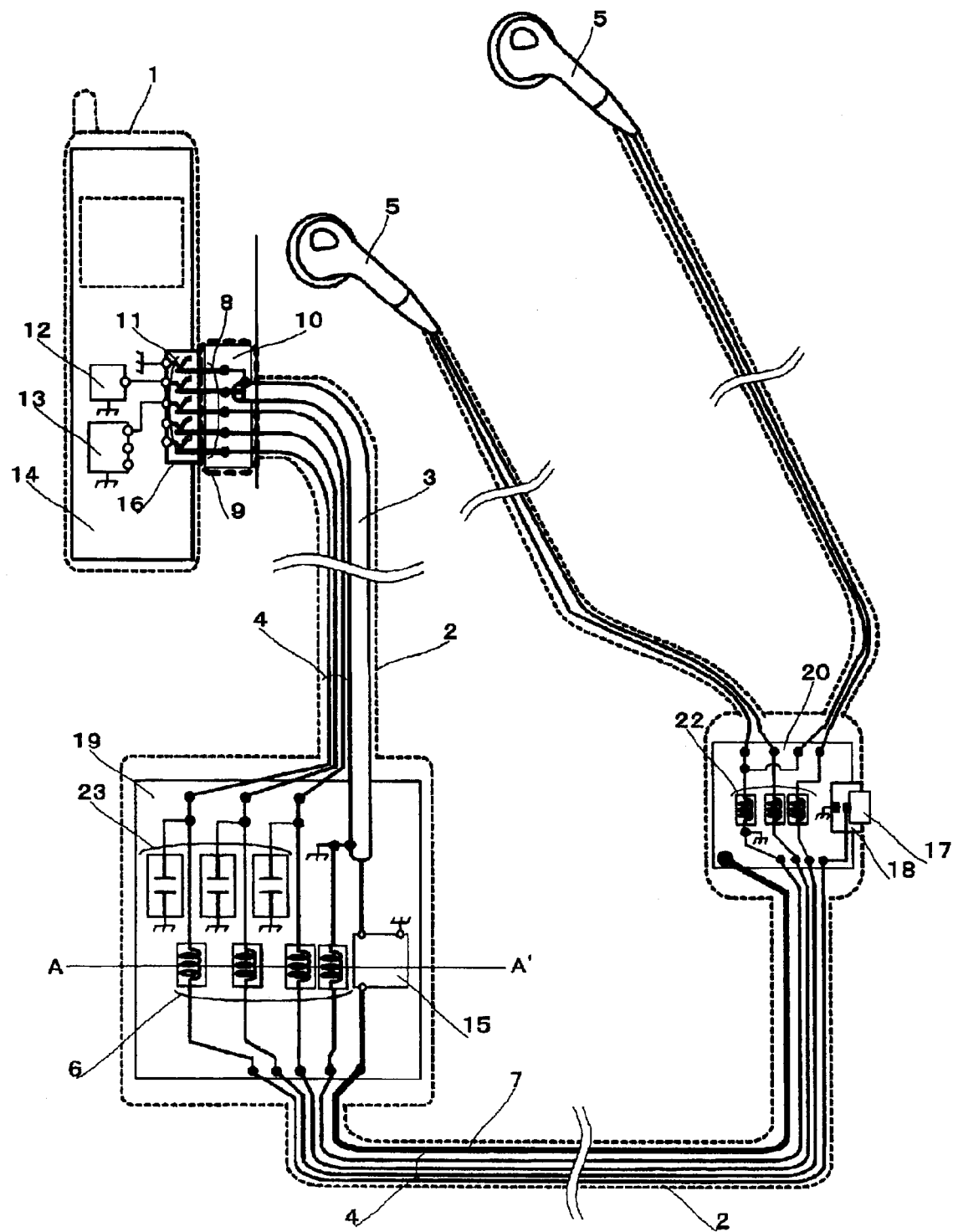
FIG. 3 is a schematic diagram showing a configuration for an antenna device and a portable radio apparatus according to a second mode according to the present invention.

FIG. 3 is a schematic diagram showing a configuration for an antenna device and a radio apparatus according to a second mode of the present invention. In the second mode, the configuration is the same as in the first mode, except that a capacitance element 23 is arranged in first relay means 19.

The capacitance element is fixed to the first relay means 19 using soldering, etc., and is located and connected between a plurality of signal lines 4 and the ground pattern of the first relay means 19. The capacitance element 23 performs a function that equalizes, at a high frequency, the potential of the external conductive member of a coaxial cable 3 with the potential of the portions of the signal lines 4 that are parallel to the coaxial cable 3. Therefore, it is possible to prevent the leaking of a high frequency current to the portions of the signal lines that are parallel to the coaxial cable 3, and to prevent deterioration of the antenna performance.

It is satisfactory when the capacitance element 23 has a low impedance relative to a signal in a frequency band of about 470 [MHz] to 700 [MHz], which is a reception frequency for the radio apparatus for the second mode, and has a high impedance relative to a frequency band of 50 [MHz] or lower and a direct current element. Through experiments, it has been confirmed that a capacitance of equal to or greater than 200 [pF] is appropriate.

With this arrangement, it is possible to suppress the deterioration of the antenna performance due to the leaking of a high frequency current to the portions of the signal lines 4 that are parallel to the coaxial cable 3, and a high antenna performance can be obtained more stably.

(Third Mode)

Figure 4:
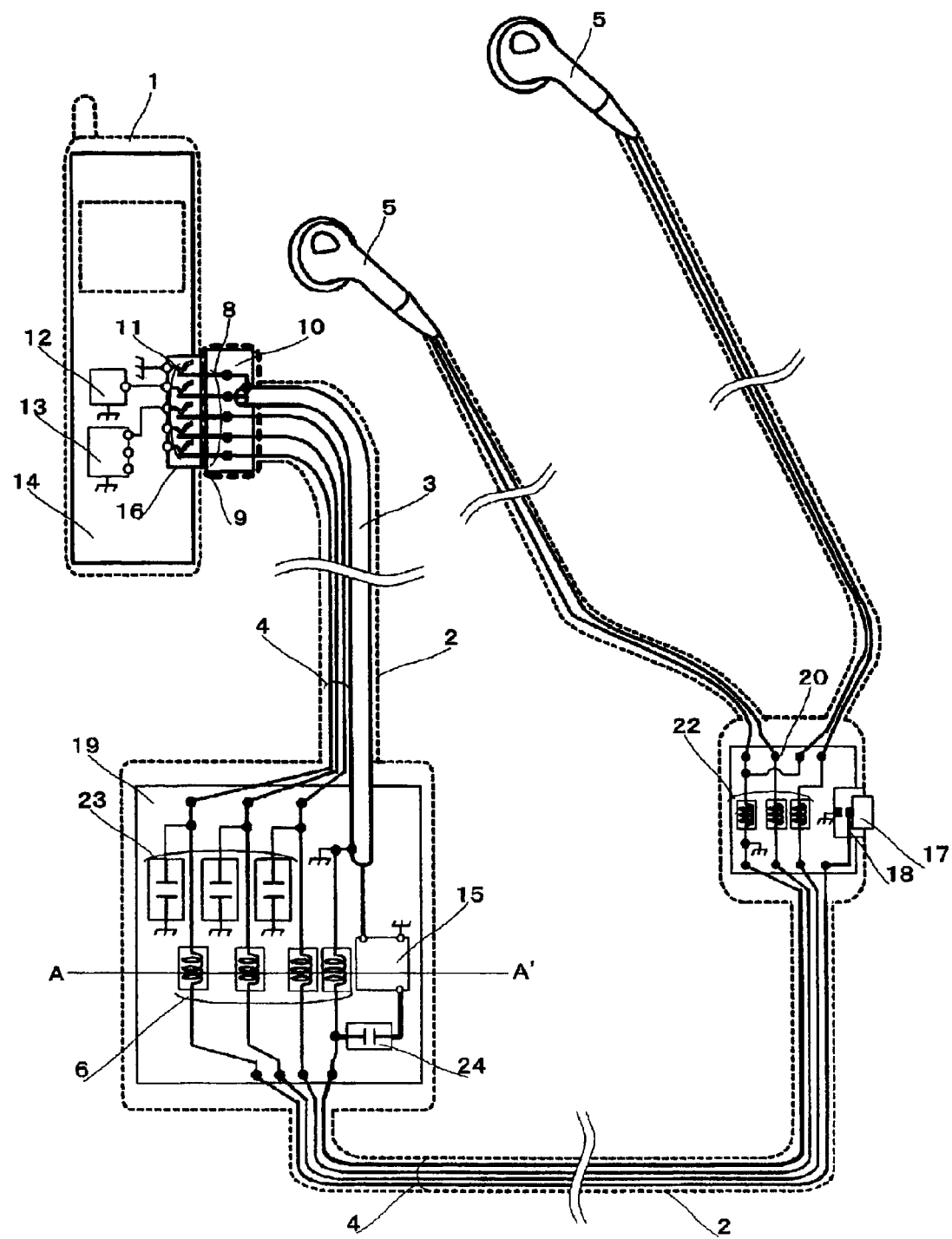
FIG. 4 is a schematic diagram showing a configuration for an antenna device and a portable radio apparatus according to a third mode according to the present invention.

FIG. 4 is a schematic diagram showing a configuration for an antenna device and a radio apparatus according to a third mode of the present invention. In the third mode, the configuration is the same as in the second mode, except that a capacitance element 24 is located in first relay means 19 and an antenna element 7 is removed.

The capacitance element 24 is fixed to the first relay means 19 using soldering, etc., and is located and connected between a matching circuit 15 and at least one of a plurality of signal lines 4. The capacitance element 24 is connected to the signal line 4 sandwiched between inductance elements 6 and inductance elements 22. Further, a low impedance for the capacitance element 24 is set for a signal in a frequency band of about 470 [MHz] to 700 [MHz] that is the reception frequency of the radio apparatus, and a high impedance is set for a frequency band of 50 [MHz] or lower and a DC current element. Through experiments, it has been confirmed that when the capacitance of the capacitance element 24 is equal to or greater than 200 [pF], a desired performance can be appropriately obtained.

According to the third mode having the thus arranged configuration, when first connection means 9 prepared at one end of a connection cable 2 is fitted to a connector 16 prepared for the radio apparatus, the signal lines 4 sandwiched between the inductance elements 6 and the inductance elements 22 serve as a monopole antenna. The matching circuit unit 15 matches the impedance of the monopole antenna and the input impedance (generally 75Ω) of a radio circuit 12. In the third mode, with this arrangement, since a high frequency signal and a low frequency signal are superimposed along the signal lines 4, an antenna element need not be additionally provided, and the signal lines 4 serve as the antenna element.

As described above, in the third mode, since the signal lines can be employed as the antenna element, and an antenna element need not be additionally provided, a high antenna performance can be obtained with a simplified structure.

In the explanation for the third mode, the capacitance element 24 having a capacitance of 200 [pF] or greater has been employed. However, the component is not limited to this, and the same effects can be obtained by employing a component, such as a high-pass filter or an LC series resonant circuit, for which a low impedance can be set for a specific high frequency band and a high impedance can be set for a low frequency band.

(Fourth Mode)

Figure 5:
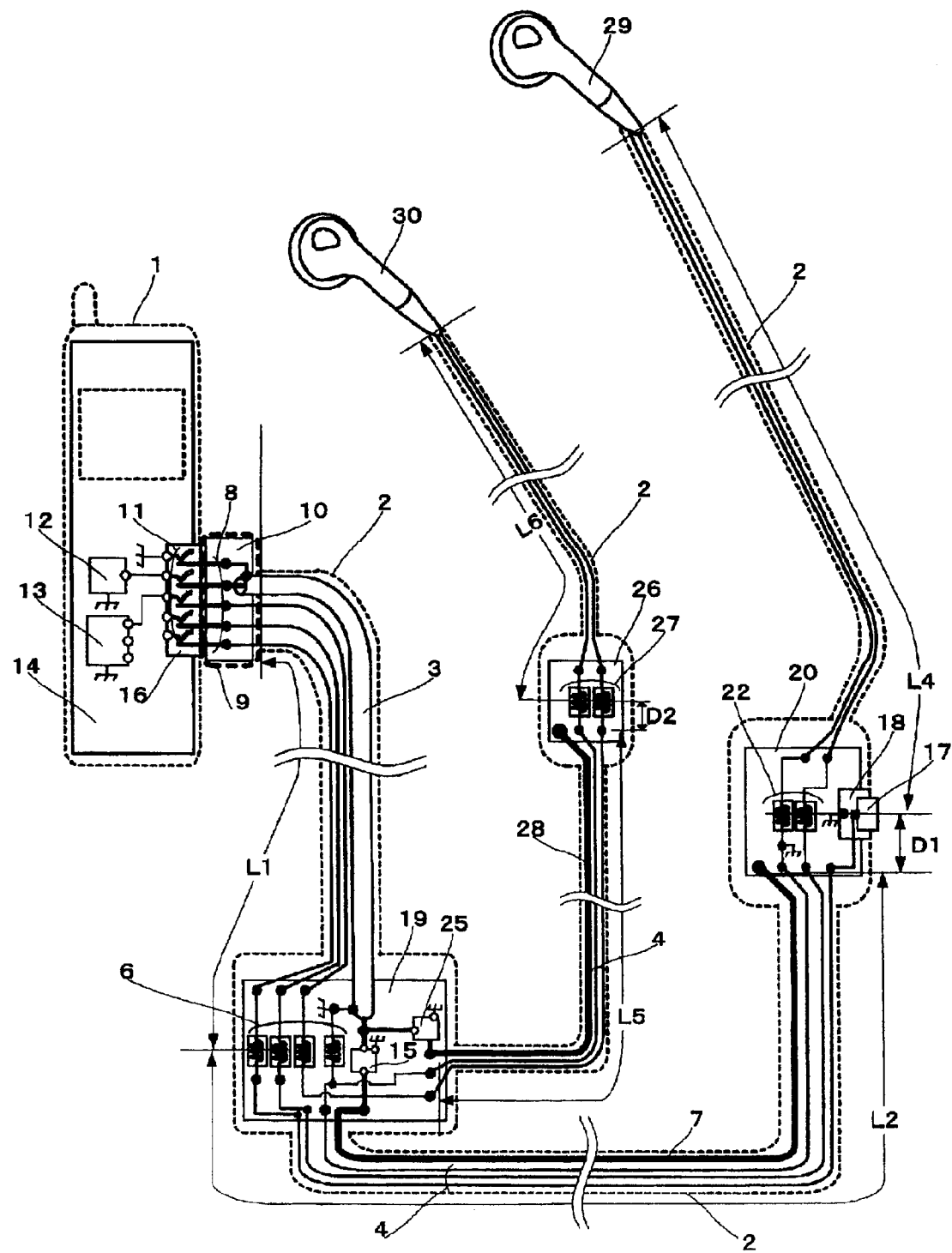
FIG. 5 is a schematic diagram showing a configuration for an antenna device and a portable radio apparatus according to a fourth mode according to the present invention.
Figure 6:
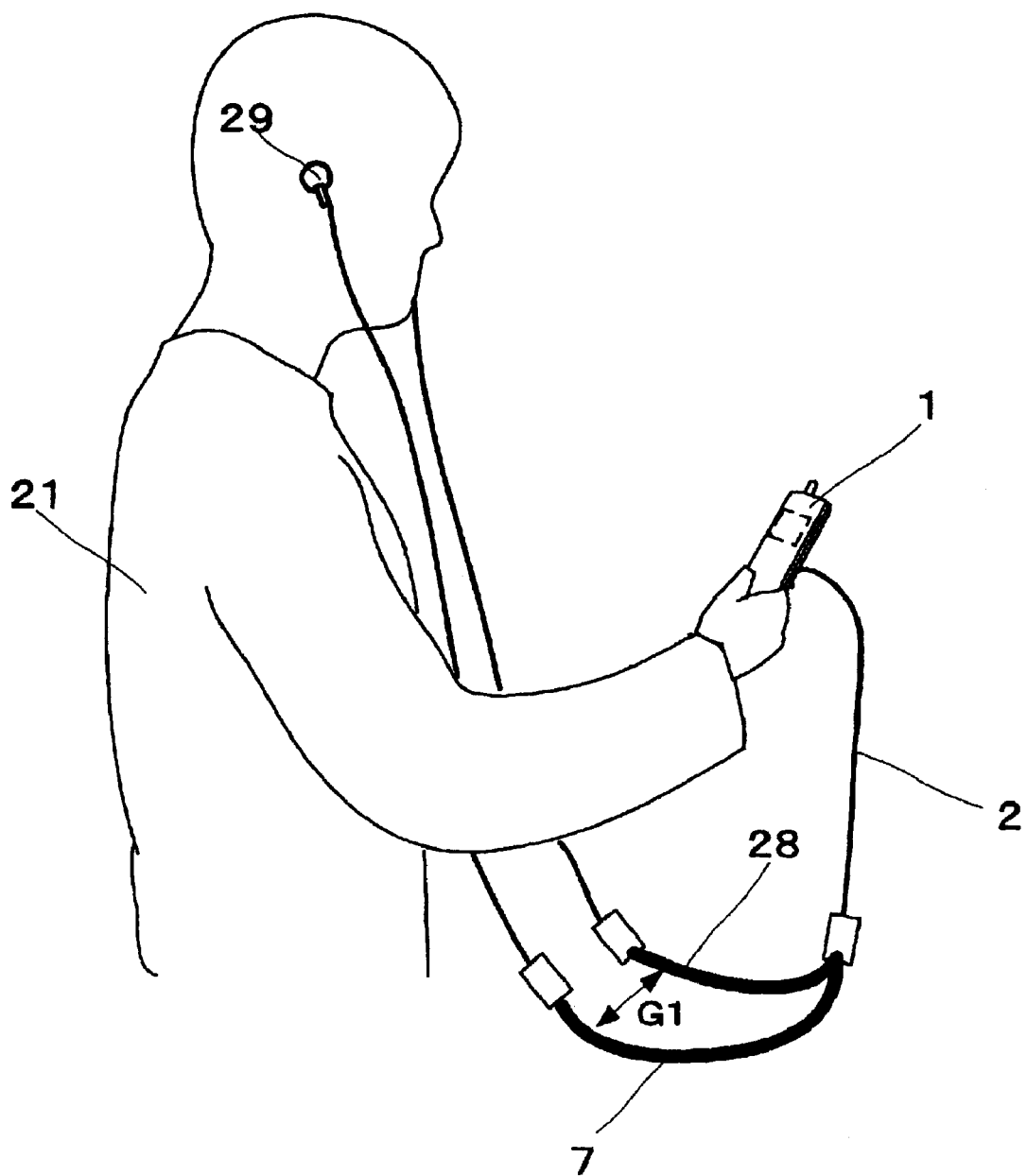
FIG. 6 is a diagram showing an example use (use state) of the fourth mode.

FIG. 5 is a schematic diagram showing a configuration for an antenna device and a radio apparatus according to a fourth mode of the present invention. FIG. 6 is a diagram showing an example use state according to the fourth mode.

No explanation will be given for the same configuration portions as those in the first to the third modes. As shown in FIG. 5, in the fourth mode, a matching circuit 15 and a matching circuit 25 are arranged in first relay means 19, and the internal conductive members of a coaxial cable 3 are connected to these circuits. A connection cable 2 is divided, in the first relay means 19, into a cable that is connected to a left earphone 30 and a cable that is connected to a right earphone 29. The matching circuit 25 is connected to an antenna element 28 located along the cable that is connected to the left earphone 30.

The antenna element 28 is formed of a flexible conductive line member, and one end is connected to the first relay means 19 while the other end is connected to a circuit board 26, so that the antenna element 28 is electrically opened on the circuit board 26 side. A length L5 is about ½ a wavelength to ⅗ a wavelength, which differs electrically from the length of the antenna element 7. In the fourth mode, the length of the antenna element 28 is defined as 35 [cm].

The antenna element 28 and a plurality of signal lines 4 are arranged parallel to each other, and are covered with and bundled by a non-conductive material that forms the connection cable 2. In this case, the antenna element 28 and the plurality of signal lines 4 contact each other via the non-conductive material that covers the signal lines 4.

To the circuit board 26, one end of the antenna element 28 and inductance elements 27 are fixed using soldering, etc.

The inductance elements 27 are inserted in series into at least one of the plurality of signal lines 4. Further, the inductance elements 27 are the same as the inductance elements 6, and perform a function, when capacitive coupling is performed between an antenna element 7 and the signal lines 4, for preventing the leaking of a high frequency signal to the signal lines 4, between the earphone unit and a circuit board 26.

It is preferable for antenna performance that there be a short distance D2 between the open end of the antenna element 28 and the inductance elements 27. Through experiments, it has been confirmed that when D2 is equal to or shorter than 3 [cm], a high antenna performance can be obtained.

The left earphone 30 is connected to the circuit board 26 via the plurality of signal lines 4. Further, the right earphone 29 is connected to the second relay means 20 via the plurality of signal lines 4.

According to the fourth mode, a distance L6 between the circuit board 26 and the earphone 30 is about 60 [cm]. The connection cable 2 is an earphone cable, one end of which is first connection means 9 and the other end of which is the earphone 29 or the earphone 30, and the entire length (L1+L2+L4=L1+L2+L6) is about 125 [cm].

In the use state as shown in FIG. 6, wherein a user is watching the screen of the radio apparatus, the antenna element 7 and the antenna element 28 are maintained horizontally at a distance from the body of the user 21. The antenna element 7 and the antenna element 21 are also separated by a distance G1. Through experiments, it has been confirmed that when G1 is equal to or greater than 1 [cm], a high antenna performance can be obtained.

According to the fourth mode, when the first connection means 9 of the connection cable 2 is fitted to a connector 16 of the radio apparatus, the antenna element 7 and the antenna element 28, which have different electrical antenna lengths, serve as monopole antennas at the same time. The matching circuit unit 15 matches the impedance of the antenna element 7 and the input impedance (generally 75Ω) of a radio circuit 12. Furthermore, the matching circuit unit 25 matches the impedance of the antenna element 28 and the input impedance (generally 75Ω) of the radio circuit 12.

With this arrangement, in the fourth mode, since the antenna element 7 and the antenna element 28 that have different electrical antenna lengths are operated as monopole antennas at the same time, the individual antenna elements resonate with each other, and a high antenna performance can be obtained across a wide frequency band (range). In addition, since the antenna element 7 and the antenna element 28 are located in the center of the connection cable 2, in the use state, the distance between the two antenna elements and the user 21 can be maintained, so that the antenna performance is not adversely affected by the human body. Further, in the use state, since the two antenna elements are maintained horizontally, an electric wave for which the principal polarized wave is horizontal can be efficiently received.

It should be noted that in the fourth mode the entire length (L1+L2+L4=L1+L2+L6) of the connection cable 2 is defined as being about 125 [cm]. The length is not limited to this, and when the length (L1+L2+L4) differs from the length (L1+L2+L6), the same effects can be obtained, so long as one of each antenna element is maintained horizontal in the use state.

Figure 9:
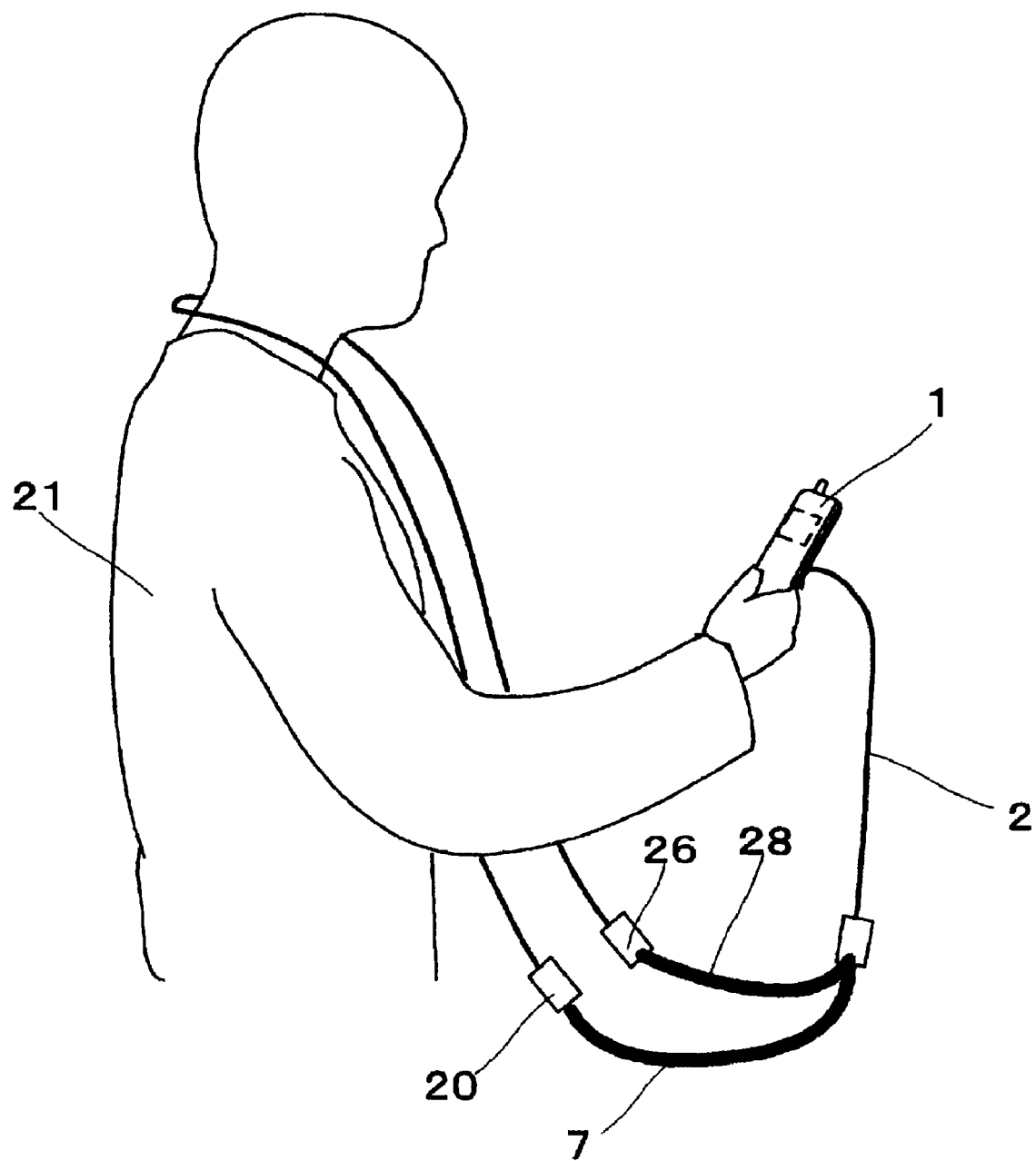
FIG. 9 is a diagram showing an example connection cable in a strap shape.

Furthermore, in the explanation of the fourth mode, the connection cable that connects a peripheral device (earphones) to the radio apparatus has been employed. However, as shown in FIG. 9, a strap form may be employed wherein the second relay means 20 and the circuit board 26 is connected by a cord element to suspend the connection cable 2 from the neck of the user 21, so that the same effects can also be obtained. In this case, either a conductive material or a non-conductive material can be employed as the cord element that connects the second relay means 20 and the circuit board 26, and a high antenna performance can be obtained. Further, when a non-conductive material is employed for the cord element that connects the second relay means 20 to the circuit board 26, the inductance elements 22 and the inductance elements 27 may be eliminated, and a high antenna performance can still be provided.

(Fifth Mode)

Figure 7:
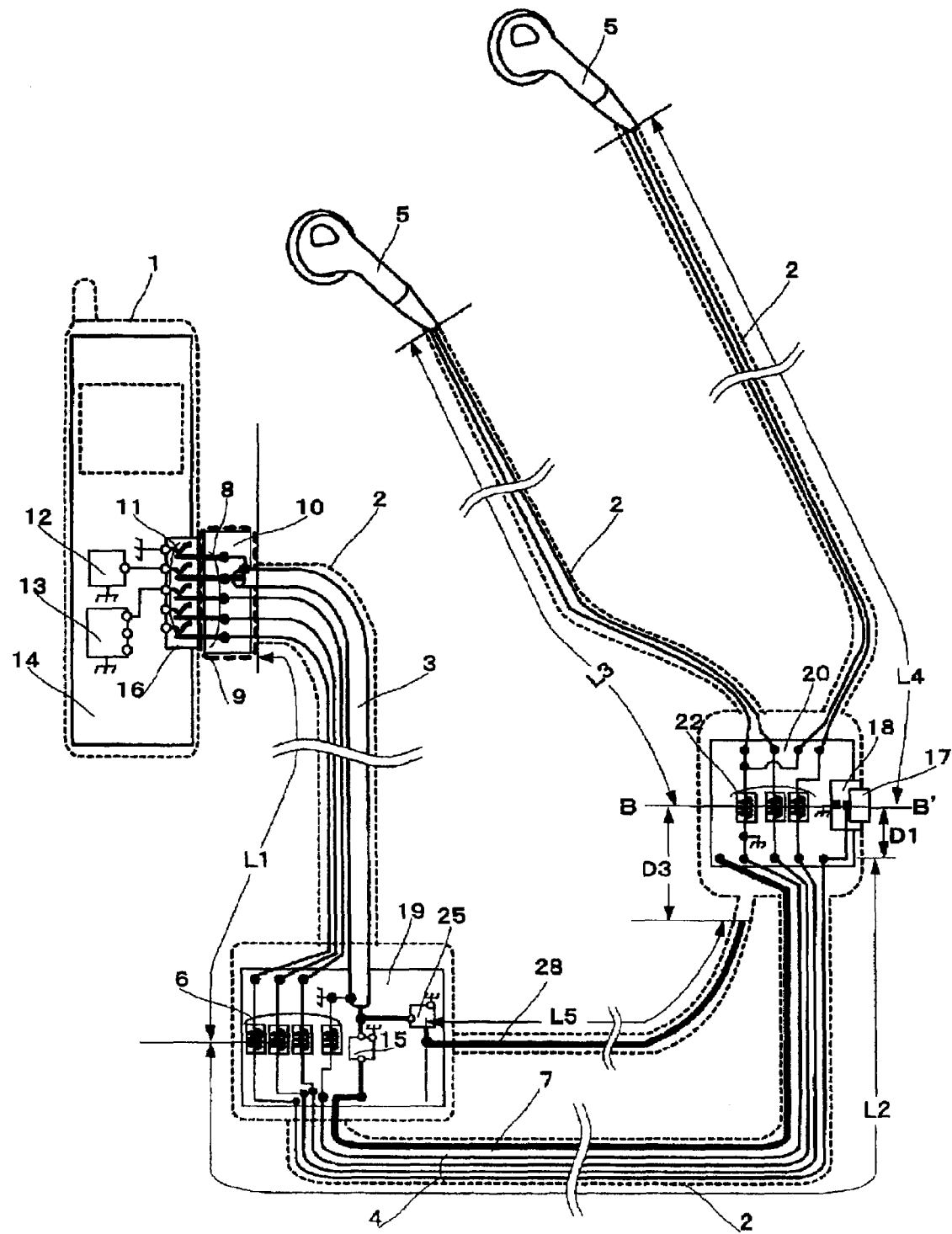
FIG. 7 is a schematic diagram showing a configuration for an antenna device and a portable radio apparatus according to a fifth mode according to the present invention.
Figure 8:
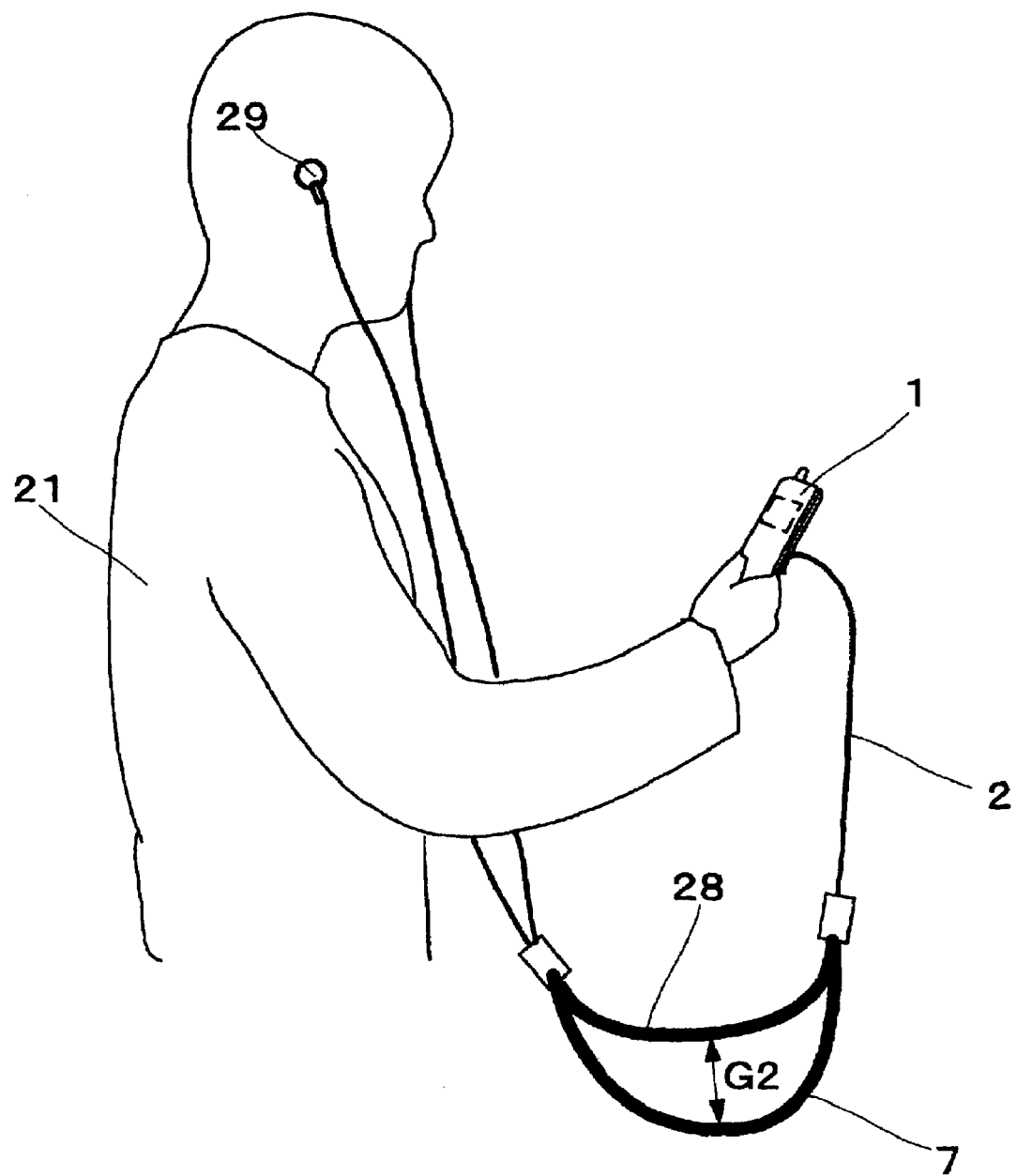
FIG. 8 is a diagram showing an example use (use state) of the fifth mode.

FIG. 7 is a schematic diagram showing a configuration for an antenna device and a radio apparatus according to a fifth mode of the present invention. FIG. 8 is a diagram showing an example use state according to the fifth mode.

No explanation will be given for the same configuration portions as in the first to the fourth modes. As shown in FIG. 7, separate from an antenna element 7, an antenna element 28 is located in a non-conductive pipe-like tube that connects first relay means 19 to second relay means 20. The side of the pipe-like tube near the open end of an antenna element 28 is connected to a non-conductive material that covers the second relay means 20. In this case, an electrical length L5 of the antenna element 28 differs from an electrical length L2 of an antenna element 7, and is resonant in a different frequency band.

As shown in FIG. 7, there are two paths between the first relay means 19 and the second relay means 20: a path 1 (L2+D1) which passes the antenna element 7 and a path 2 (L5+D3) which passes the antenna element 28. In this case, a distance D3 from inductance elements 22 to the open end of the antenna element 28 is adjusted, so that the path 1 (L2+D1) differs from the path L2 (L2+D3) by about 10 [cm]. According to this arrangement, as shown in FIG. 8, in the use state, a distance G2 is present between the antenna element 7 and the antenna element 28. In the fifth mode, the interval is about 5 [cm].

In the use state shown in FIG. 8, wherein a connection cable 2 descends in the direction of gravity, the distance G2 is normally obtained. Through experiments, it has been confirmed that a high antenna performance is obtained when the distance G2 is equal to or greater than 1 [cm].

In the fifth mode, since the antenna element 7 and the antenna element 28, which have different electrical lengths, serve as monopole antennas at the same time, compared with when a single antenna element is employed, the individual antennas resonate with each other, and a high antenna performance is obtained across a wide frequency range.

Further, since the antenna element 7 and the antenna element 28 are located in the center of the connection cable 2, in the use state, the distance between the two antenna elements and a human body (the user 21) is ensured, so that the antenna performance is not adversely affected by a human body. Thus, a high antenna performance can be obtained. Further, since the two antenna elements are maintained horizontal in the use state, an electric wave, for which the principal polarized wave is horizontal, can be efficiently received. Further, the distance between the two antenna elements can be fixed in the use state, and deterioration of the antenna performance due to electromagnetically coupling, when a plurality of antennas are near each other, can be reduced.

It should be noted that in the fifth mode the number of antenna elements is two. However, the number of antenna elements is not limited to this, and a plurality of antenna elements, equal to or greater than two, may be provided, so that a wider frequency band can be coped with.

(Sixth Mode)

Figure 10:
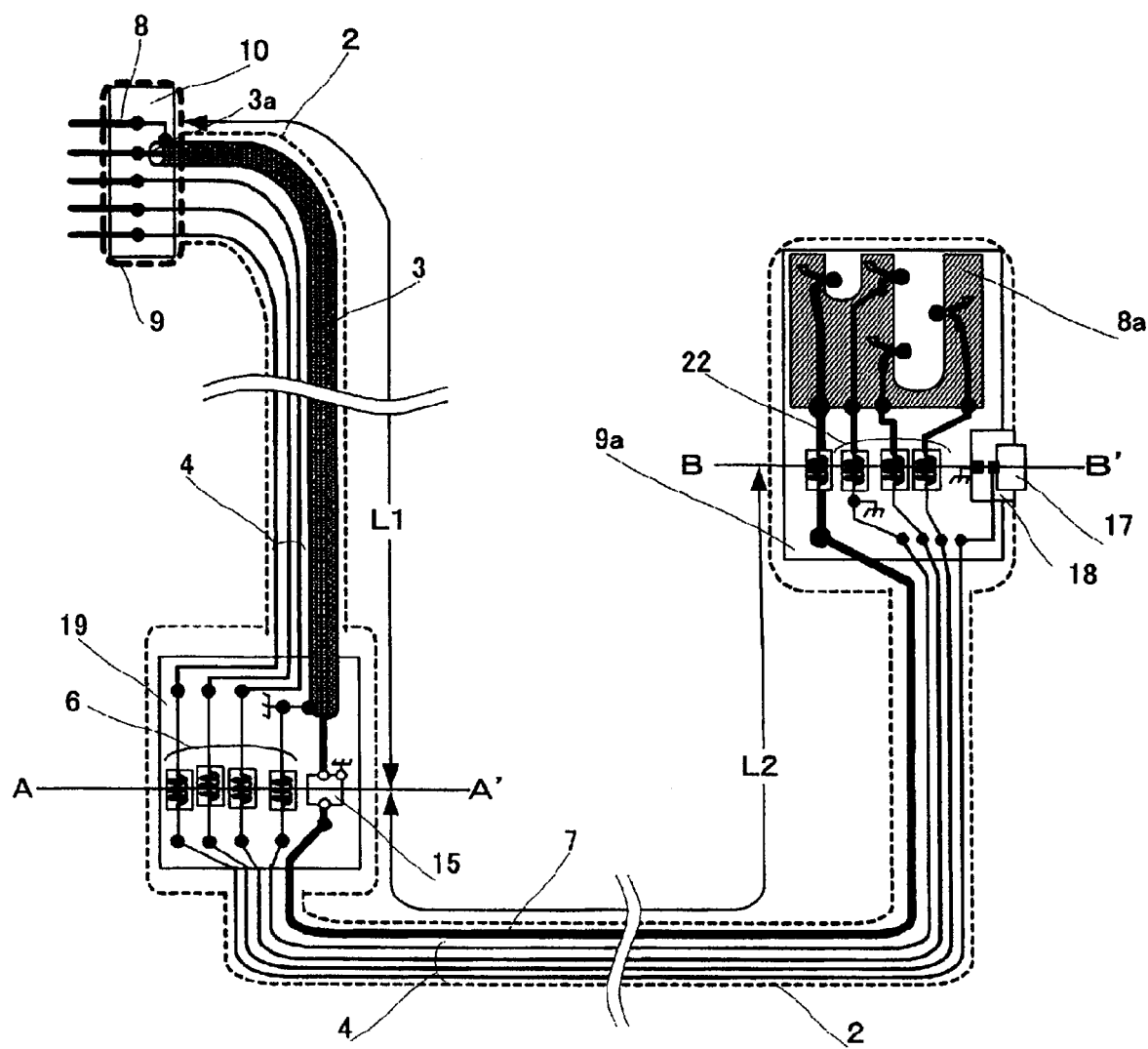
FIG. 10 is a schematic diagram showing the configuration of an antenna device according to a sixth mode.
Figure 11:
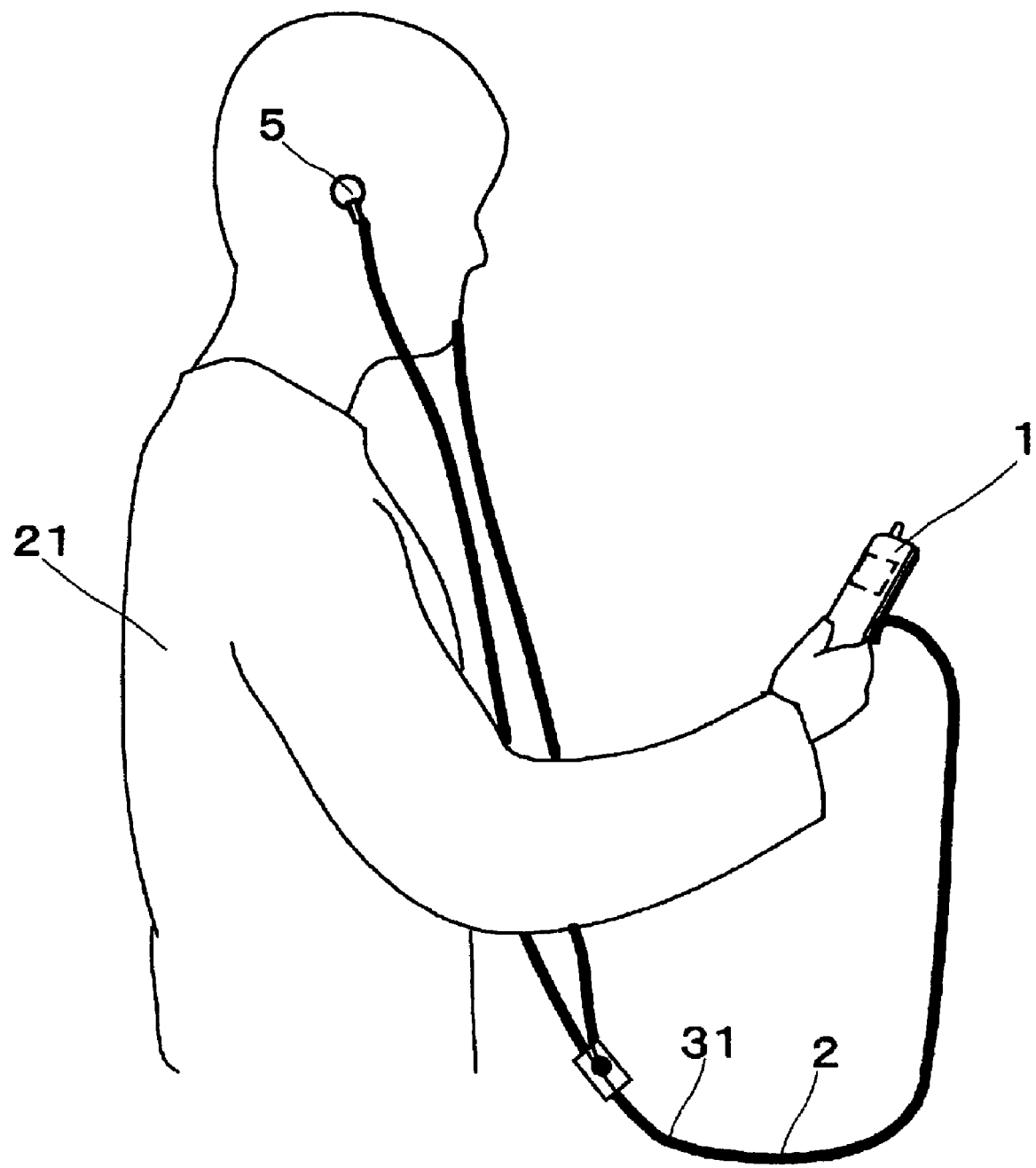
FIG. 11 is a diagram showing an example use state according to patent document 1.
Figure 12:
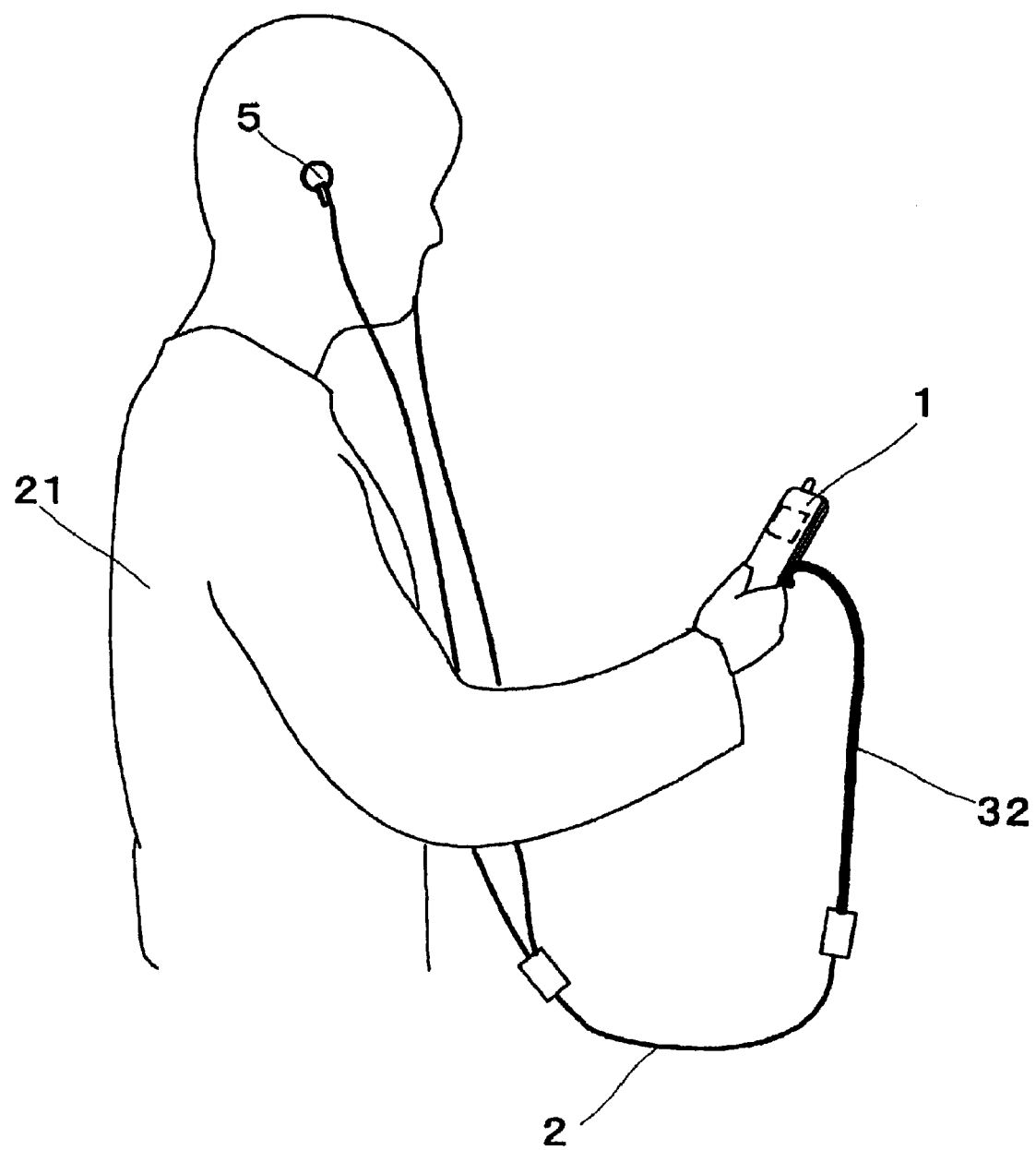
FIG. 12 is a diagram showing an example use state according to patent document 2.

FIG. 10 is a schematic diagram showing the configuration of an antenna device according to a sixth mode of the present invention.

No explanation will be given for the same configuration portions as in the first to the fifth mode. As shown in FIG. 10, instead of second relay means, the antenna device includes second connection means 9a at the end of the first connection means 9 on the other side, where it is connected to the portable radio apparatus.

The second connection means 9a includes a peripheral device connector 8a that connects to peripheral devices. With this arrangement, various peripheral devices, such as earphones, loudspeakers, a microphone and a remote controller, can be connected.

The present invention has been explained in detail by referring to the specific modes. However, it will be apparent to one having ordinary skill in the art that the present invention can be variously modified or altered, without departing from the spirit and scope of the invention.

The present invention is based on Japanese Patent Application No. 2005-026725, filed Feb. 2, 2005, and Japanese Patent Application No. 2005-246451, filed Aug. 26, 2005, and the contents of these applications are included as references.

INDUSTRIAL APPLICABILITY

The present invention relates to an antenna device that serves as an external antenna for a radio apparatus, and is useful as a connection cable whose antenna performance is not deteriorated in the use state by an adverse affect attributable to the near proximity of a human body.

The invention claimed is:

1. An antenna device, integrally formed with a first connector which is to be connected to a radio apparatus, a second connector which is to be connected to a peripheral device, and a connection cable and an antenna element, which are located between the first connector and the second connector, and which transmit a plurality of signals from the radio apparatus to the peripheral device, comprising:

a first relay unit, located at a middle position in the connection cable, for relaying the plurality of signals;

the antenna element, located between the second connector and the first relay unit; and a coaxial line, located between the first connector and the first relay unit for transmitting, to the radio apparatus, an antenna reception signal that has been received at the antenna element and has been extracted by the first relay unit; wherein the antenna element serves as an external antenna for the radio apparatus.

2. The antenna device according to claim 1, wherein:

the first relay unit includes a first inductance element, which is to be inserted in series into at least one of a plurality of signal lines extended to the peripheral device;

the second connector includes a second inductance element, which is to be inserted in series into the plurality of signal lines;

the first inductance element and the second inductance element, which at least pass an audio signal while blocking the antenna reception signal; and the first relay unit extracts the antenna reception signal.

3. The antenna device according to claim 1, wherein:

an external conductive member for a coaxial cable, which employs the coaxial line as a core line, is connected to a ground potential of the radio apparatus;

the first relay unit includes a capacitance element on the first connector side, relative to the first inductance element; and the capacitance element is arranged between the plurality of signal lines and the external conductive member.

4. The antenna device according to claim 1, wherein:

the first relay unit includes a capacitance element on the second connector side, relative to the first inductance element;

the capacitance element is arranged between the plurality of signal lines and the coaxial line; and instead of the antenna element, at least one of the signal lines is operated as a monopole antenna and serves as an external antenna for the radio apparatus.

5. The antenna device according to claim 1, wherein the second connector includes a controller for controlling the radio apparatus via the connection cable and the coaxial cable.

6. The antenna device according to claim 1, wherein the peripheral device is earphones.

7. The antenna device according to claim 1, wherein, in the use state, during which the connection cable is connected to the radio apparatus, both or one of the first antenna element and the second antenna element is substantially horizontal.

8. An antenna device, integrally formed with a first connector, which is to be connected to a radio apparatus, a connection cable, along which a plurality of signals are transmitted from the radio apparatus to a peripheral device, and an antenna element, comprising:
- a first relay unit and a second relay unit, for relaying the plurality of signals, positioned at a predetermined interval at locations along the connection cable;
- the antenna element, located between the first relay unit and the second relay unit; and
- a coaxial line, located between the first connector and the first relay unit, for transmitting to the radio apparatus an antenna reception signal that is received by the antenna element and is extracted by the first relay unit;
- wherein the antenna element serves as an external antenna for the radio apparatus.

9. The antenna device according to claim 8, wherein:
- the first relay unit includes a first inductance element, which is to be inserted in series in at least one of a plurality of signal lines to be extended to the peripheral device;
- the second relay unit includes a second inductance element, which is to be inserted in series into at least one of the plurality of signal lines; the first inductance element and the second inductance element, which at least passes an audio signal while blocking the antenna reception signal; and
- the first relay unit, which extracts the antenna reception signal.

10. The antenna device according to claim 8, wherein:
- an external conductive member for a coaxial cable, which employs the coaxial line as a core line, is connected to a ground potential of the radio apparatus;
- the first relay unit includes a capacitance element on the first connector side, relative to the first inductance element; and
- the capacitance element is arranged between the plurality of signal lines and the external conductive member.

11. The antenna device according to claim 8, wherein:
- the first relay unit includes a capacitance element on the second relay unit side, relative to the first inductance element;
- the capacitance element is arranged between the plurality of signal lines and the coaxial line; and
- instead of the antenna element, at least one of the signal lines is operated as a monopole antenna and serves as an external antenna for the radio apparatus.

12. The antenna device according to claim 8, wherein the second relay unit includes a controller for controlling the radio apparatus via the connection cable and the coaxial cable.

13. The antenna device according to claim 8, wherein the peripheral device is earphones.

14. The antenna device according to claim 8, wherein, in the use state, during which the connection cable is connected to the radio apparatus, both or one of the first antenna element and the second antenna element is substantially horizontal.

15. An antenna device, integrally formed with a first connector, which is to be connected to a radio apparatus, connection cables, along which a plurality of signals are to be transmitted from the radio apparatus to a peripheral device, and a plurality of antenna elements, comprising:
- a first relay unit, located at a position along one of the connection cables, for relaying the plurality of signals;
- a second relay unit, branched from the first relay unit and located at a position along one of the connection cables, for relaying the plurality of signals;
- a third relay unit, branched from the first relay unit and located at a position along the other connection cable, for relaying the plurality of signals;
- a first antenna element, located between the first relay unit and the second relay unit;
- a second antenna element, located between the first relay unit and the third relay unit; and
- a coaxial line, located between the first connector and the first relay unit, for transmitting to the radio apparatus an antenna reception signal that is received by the first antenna element and/or the second antenna element and is extracted by the first relay unit;
- wherein the first antenna element and/or the second antenna element serves as an external antenna for the radio apparatus.

16. The antenna device according to claim 15, wherein:
- the first relay unit includes a first inductance element, which is to be inserted in series in at least one of a plurality of signal lines to be extended to the peripheral device;
- the second relay unit includes a second inductance element, which is to be inserted in series into at least one of the plurality of signal lines; the first inductance element and the second inductance element, which at least passes an audio signal while blocking the antenna reception signal; and
- the first relay unit, which extracts the antenna reception signal.

17. The antenna device according to claim 15, wherein:
- an external conductive member for a coaxial cable, which employs the coaxial line as a core line, is connected to a ground potential of the radio apparatus;
- the first relay unit includes a capacitance element on the first connector side, relative to the first inductance element; and
- the capacitance element is arranged between the plurality of signal lines and the external conductive member.

18. The antenna device according to claim 15, wherein:
- the first relay unit includes a capacitance element on the second relay unit side, relative to the first inductance element;
- the capacitance element is arranged between the plurality of signal lines and the coaxial line; and
- instead of the antenna element, at least one of the signal lines is operated as a monopole antenna and serves as an external antenna for the radio apparatus.

19. The antenna device according to claim 15, wherein the second relay unit includes a controller for controlling the radio apparatus via the connection cable and the coaxial cable.

20. The antenna device according to claim 15, wherein electrical lengths differ between the first antenna element and the second element.

21. The antenna device according to claim 15, wherein the peripheral device is earphones.

22. The antenna device according to claim 15, wherein, in the use state, during which the connection cable is connected to the radio apparatus, both or one of the first antenna element and the second antenna element is substantially horizontal.

23. An antenna device, integrally formed with a first connector, which is to be connected to a radio apparatus, a connection cable, along which a plurality of signals are to be transmitted from a radio apparatus to a peripheral device, and an antenna element, comprising:
- a first relay unit and a second relay unit, located at a predetermined interval at positions along the connection cable, for relaying the plurality of signals;

a first antenna element and a second antenna element, located along two cables that connect the first relay unit and the second relay unit; and a coaxial line, located between the first connector and the first relay unit, for transmitting to the radio apparatus an antenna reception signal that is received by the first antenna element and/or the second antenna element and is extracted by the first relay unit;

wherein the first antenna element and/or the second antenna element serves as an external antenna for the radio apparatus.

24. The antenna device according to claim 23, wherein:

the first relay unit includes a first inductance element, which is to be inserted in series in at least one of a plurality of signal lines to be extended to the peripheral device;

the second relay unit includes a second inductance element, which is to be inserted in series into at least one of the plurality of signal lines; the first inductance element and the second inductance element, which at least passes an audio signal while blocking the antenna reception signal; and the first relay unit, which extracts the antenna reception signal.

25. The antenna device according to claim 23, wherein:

an external conductive member for a coaxial cable, which employs the coaxial line as a core line, is connected to a ground potential of the radio apparatus;

the first relay unit includes a capacitance element on the first connector side, relative to the first inductance element; and the capacitance element is arranged between the plurality of signal lines and the external conductive member.

26. The antenna device according to claim 23, wherein:

the first relay unit includes a capacitance element on the second relay unit side, relative to the first inductance element;

the capacitance element is arranged between the plurality of signal lines and the coaxial line; and instead of the antenna element, at least one of the signal lines is operated as a monopole antenna and serves as an external antenna for the radio apparatus.

27. The antenna device according to claim 23, wherein the second relay unit includes a controller for controlling the radio apparatus via the connection cable and the coaxial cable.

28. The antenna device according to claim 23, wherein electrical lengths differ between the first antenna element and the second element.

29. The antenna device according to claim 23, wherein the peripheral device is earphones.

30. The antenna device according to claim 23, wherein, in the use state, during which the connection cable is connected to the radio apparatus, both or one of the first antenna element and the second antenna element is substantially horizontal.

* * * * *